(12) United States Patent
Citta et al.

(10) Patent No.: US 6,442,221 B1
(45) Date of Patent: Aug. 27, 2002

(54) GHOST ELIMINATING EQUALIZER

(75) Inventors: Richard W. Citta, Oak Park; Jingsong Xia, Mundelein, both of IL (US)

(73) Assignee: Zenith Electronics Corporation, Lincolnshire, IL (US)

( * ) Notice: Subject to any disclaimer, the term of this patent is extended or adjusted under 35 U.S.C. 154(b) by 0 days.

(21) Appl. No.: 09/158,730

(22) Filed: Sep. 22, 1998

(51) Int. Cl.[7] .............................. H03D 1/04; H03D 1/06; H03K 5/01; H03K 6/04; H04B 1/10
(52) U.S. Cl. ........................................ 375/346; 348/614
(58) Field of Search ................................. 375/254, 285, 375/296, 350, 346, 377; 708/400, 402–405; 348/607, 614; 370/210, 208

(56) References Cited

U.S. PATENT DOCUMENTS

| 3,688,048 A |   | 8/1972 | Clark ................. 179/15 BW |
|---|---|---|---|
| 4,021,738 A | * | 5/1977 | Gitlin et al. |
| 4,972,474 A | * | 11/1990 | Sabin ......................... 380/28 |
| 4,980,897 A | * | 12/1990 | Decker et al. |
| 5,151,783 A | * | 9/1992 | Faroudja |
| 5,317,595 A |   | 5/1994 | Ostman ........................ 375/14 |
| 5,610,908 A | * | 3/1997 | Shelswell et al. ............ 370/210 |
| 5,615,208 A |   | 3/1997 | Hagmanns ................... 370/252 |
| 5,710,799 A | * | 1/1998 | Kobayashi ................... 375/349 |
| 5,835,536 A | * | 11/1998 | May et al. .................... 375/316 |
| 5,943,447 A | * | 8/1999 | Tkhor et al. ................. 382/253 |
| 6,005,894 A | * | 12/1999 | Kumar ......................... 275/270 |
| 6,026,123 A | * | 2/2000 | Williams ...................... 375/285 |
| 6,157,909 A | * | 12/2000 | Manuuary et al. ........... 704/228 |

OTHER PUBLICATIONS

John G. Proakis, "Digital Comminications", McGraw–Hill, second edition, pp. 561–569.
International Search Report, dated Jan. 7, 1999, Application No. PCT/US99/05495.

* cited by examiner

Primary Examiner—Jean Corrielus

(57) ABSTRACT

A receiver receives a signal containing data distributed in both time and frequency. The receiver includes a vector transform arranged to perform a transform on the received signal using a plurality of receiver transform vectors. The receiver transform vectors are based upon a corresponding plurality of transmitter vectors modified in accordance with channel effects so that the data can be recovered by the vector transform even in the presence of strong ghosts.

39 Claims, 2 Drawing Sheets

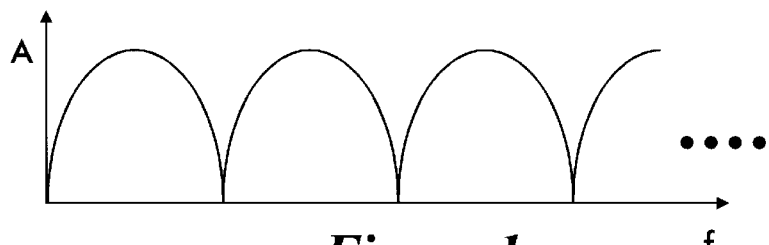
Figure 1
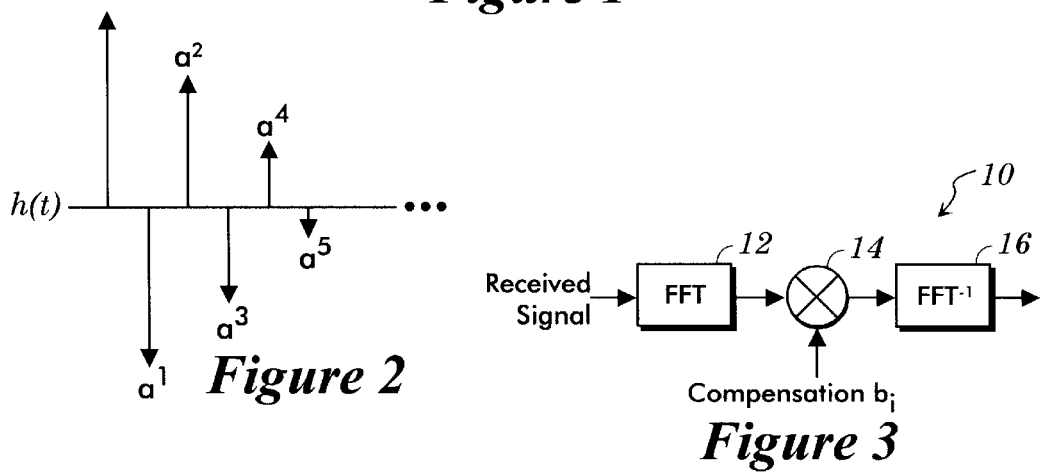
Figure 2
Figure 3
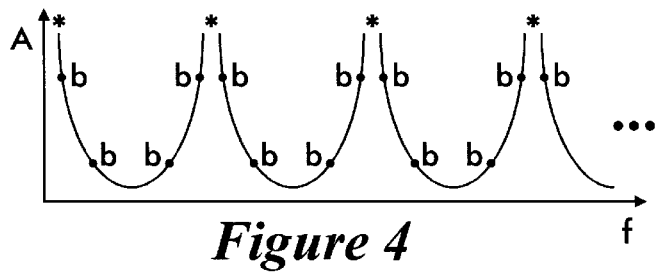
Figure 4
Figure 5
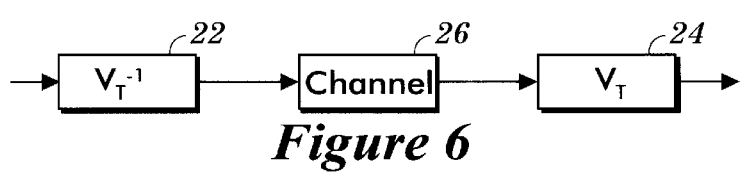
Figure 6

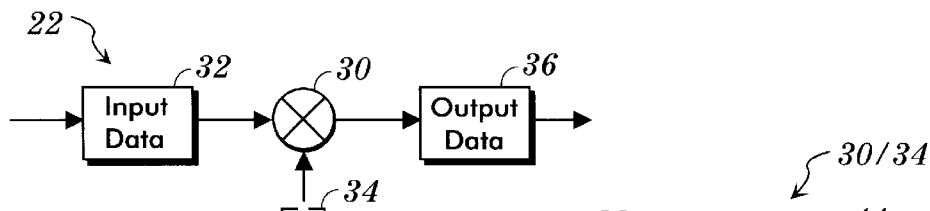
Figure 7
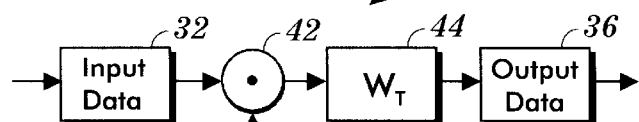
Figure 8
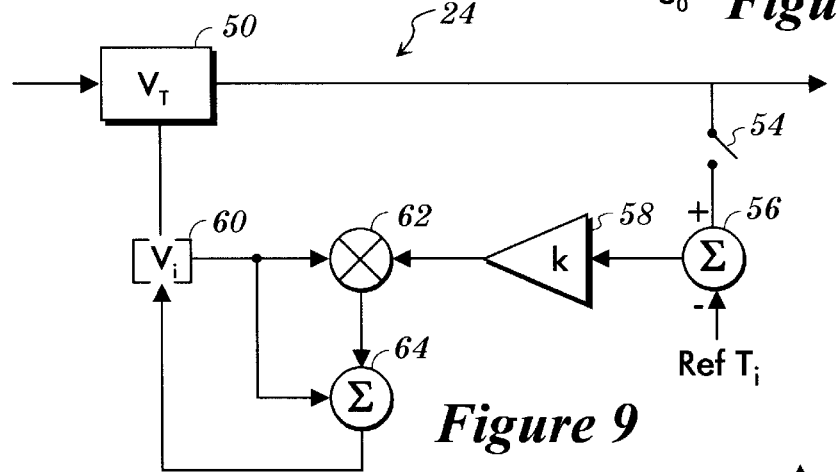
Figure 9
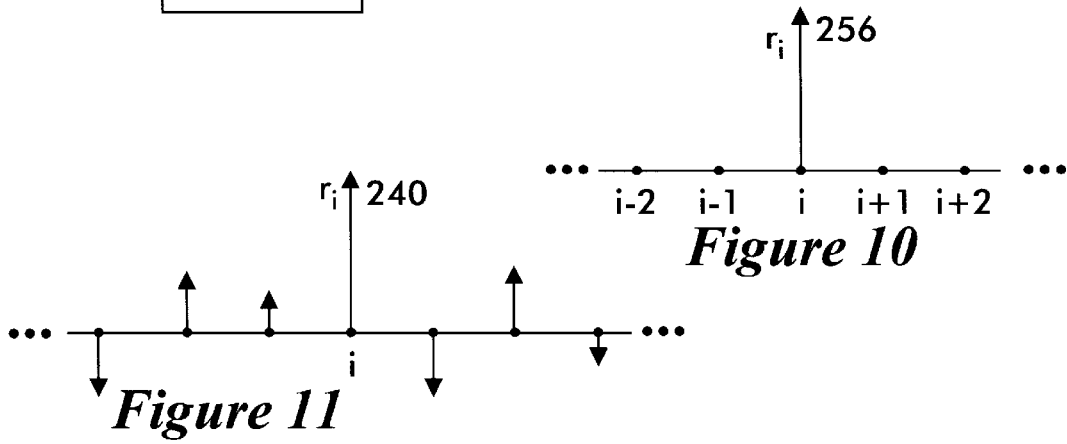
Figure 10
Figure 11
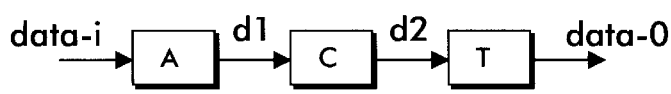
Figure 12

GHOST ELIMINATING EQUALIZER

TECHNICAL FIELD OF THE INVENTION

The present invention is directed to an equalizer that substantially eliminates ghosts in signals processed by a receiver.

BACKGROUND OF THE INVENTION

Ghosts are produced in a receiver usually because a signal arrives at the receiver through different transmission paths. For example, in a system having a single transmitter, the multipath transmission of a signal may occur because of signal reflection. That is, the receiver receives a transmitted signal and one or more reflections of the transmitted signal. As another example, the multipath transmission of a signal may occur in a system having plural transmitters that transmit signals to the same receiver using the same carrier frequency. A network which supports this type of transmission is typically referred to as a single frequency network.

When a signal reaches a receiver through two or more different transmission paths, an interference pattern results. In the frequency domain, this interference pattern is manifested by a variable signal amplitude along the frequency axis. The worst case interference pattern results when the ghost is 100% and is shown in FIG. 1. This interference pattern has amplitude nulls or near amplitude nulls at certain frequencies. Therefore, any information contained in the received signal at these frequencies is likely lost because the signal to noise ratio near these frequencies is below a usable threshold.

A variety of systems have been devised to deal with the problems caused by ghosts. For example, spread spectrum systems deal very adequately with the problem of a 100% ghost by spreading the transmitted data over substantial bandwidth. Accordingly, even though a 100% ghost means that some information may be lost at the frequencies corresponding to amplitude nulls, a data element can still be recovered because of the high probability that it was spread over frequencies which do not correspond to amplitude nulls. Unfortunately, the data rate R associated with spread spectrum systems is typically too low for many applications. (The data rate R is defined as the number of data bits per Hertz of channel bandwidth.)

It is also known to use a matched filter in a receiver in order to deal with the problem of a ghost. In this approach, data is transmitted as a data vector. The matched filter correlates the received data with reference vectors corresponding to the possible data vectors that can be transmitted. Correlation of the received signal to the reference vector corresponding to the transmitted data vector produces a large peak, and correlation of the received signal to the other possible reference vectors produces small peaks. Accordingly, the transmitted data vector can be easily determined in the receiver. Unfortunately, the data rate R typically associated with the use of matched filters is still too low for many applications.

When high data rates, such as $R \geq 1$, are required, equalizers are often used in a receiver in order to reduce ghosts. A classic example of a time domain equalizer is an FIR filter. An FIR filter convolves its response h(t), shown generally in FIG. 2, with the received signal and produces a large peak representative of the main received signal. Ghosts have small components in the output of the FIR filter. However, as shown in FIG. 2, the values $a^1$, $a^2$, $a^3$, . . . of the taps of an FIR filter depend on the value of a and, in order to perfectly cancel a 100% ghost using an FIR filter, the value a of the FIR filter response must approach 1. As the value a approaches 1, the values of the taps of the FIR filter do not asymptotically decrease toward zero. Therefore, the FIR filter becomes infinitely long if a 100% ghost is to be eliminated, making the FIR filter impractical to eliminate a 100% ghost.

Also, another problem with the use of an FIR filter is noise enhancement. If the transmitted signal picks up noise $N_c$ in the channel, this noise is enhanced by the FIR filter so that the noise $N_0$ at the output of the FIR filter is greater than the channel noise $N_c$. Also, if the channel noise $N_c$ is white, the noise $N_0$ at the output of the FIR filter is non-white, i.e., bursty.

An example of a frequency domain equalizer 10 is shown in FIG. 3. The frequency domain equalizer 10 includes a Fast Fourier Transform (FFT) module 12 which performs a Fast Fourier Transform on the received signal in order to transform the received signal to the frequency domain. A multiplier 14 multiplies the frequency domain output of the FFT module 12 by a compensation vector which includes a row of coefficients $b_i$. An inverse FFT module 16 performs an inverse FFT on the multiplication results from the multiplier 14 in order to transform the multiplication results to the time domain.

It should be noted that, when the frequency domain equalizer 10 is used to eliminate ghosts, the frequency domain equalizer 10 must be included in every receiver. In order to reduce receiver cost, therefore, it is known to incorporate the inverse FFT module 16 into the transmitter so that the receivers require only the FFT module 12 and the multiplier 14. A consequence of moving the inverse FFT 16 to the transmitter is that data is transmitted in many discrete frequency channels. Accordingly, in the presence of a 100% ghost, the transmitted data is not recoverable around the null frequencies of FIG. 1.

FIG. 4 illustrates an exemplary set of coefficients $b_i$ which may be used by the frequency domain equalizer 10. In order to derive the coefficients $b_i$, an estimator may be used at the output of the Fast Fourier Transform (FFT) module 12. This estimator models FIG. 1 and inverts this model in order to produce the coefficients $b_i$ of FIG. 4. Accordingly, the coefficients $b_i$ are chosen so that, when they and the FFT of the received signal are multiplied by the multiplier 14, the coefficients $b_i$ cancel the ghost. It should be noted that the coefficients $b_i$ should have infinite amplitudes at the frequencies where the interference pattern has a zero amplitude. However, the coefficients $b_i$ cannot be made infinite as a practical matter. Accordingly, the coefficients $b_i$ are cut off at these frequencies. An advantage of cutting off the coefficients $b_i$ is that noise enhancement at the frequencies where the coefficients $b_i$ are cut off is materially reduced. Thus, noise enhancement is lower at the output of the frequency domain equalizer 10 than would otherwise be the case. However, a disadvantage of cutting off the coefficients $b_i$ is that information in the received signal is lost at the cut off frequencies so that the output of the inverse FFT module 16 becomes only an approximation of the transmitted data.

Moreover, it is known to use empty guard intervals between the vectors employed in the frequency domain equalizer 10 of FIG. 3. The guard intervals are shown in FIG. 5 and are provided so that received vectors and ghosts of the received vectors do not overlap because such an overlap could otherwise cause intersymbol interference. Thus, the guard intervals should be at least as long as the expected ghosts. It is also known to use cyclic extensions of the vectors in order to give the received signal an appearance of periodicity. Accordingly, a Fast Fourier Transform of the received signal and a Fourier Transform of the received signal appear identical.

The present invention is directed to an equalizer which overcomes one or more of the above noted problems.

SUMMARY OF THE INVENTION

In accordance with one aspect of the present invention, a receiver receives a signal containing data distributed in both time and frequency. The receiver comprises a vector transform and a vector adjuster. The vector transform is arranged to perform a transform on the received signal using a plurality of transform vectors. The vector adjuster is responsive to the transform of the received signal in order to adjust the transform vectors so that the data can be recovered even in the presence of a strong ghost.

In accordance with another aspect of the present invention, a receiver receives a signal containing data distributed in both time and frequency. The receiver includes a vector transform that is arranged to perform a transform on the received signal using a plurality of receiver transform vectors. The receiver transform vectors are based upon a corresponding plurality of transmitter vectors and channel effects so that the data can be recovered by the vector transform even in the presence of a strong ghost.

In accordance with yet another aspect of the present invention, a receiver receives a signal from a channel. $C^*$ designates the channel with interference. The signal contains data, and the data has been processed by a transmitter transform so that the data is distributed in both time and frequency. A designates the transmitter transform. The receiver includes a receiver transform arranged to perform a transform on the received signal using a plurality of receiver transform vectors so as to recover the data even in the presence of a strong ghost, and $T^*$ designates the receiver transform. The receiver transform vectors are arranged so that the following equation is satisfied: $A \times C^* \times T^* = I$, wherein I is substantially the identity matrix.

In accordance with yet another aspect of the present invention, a communication system includes a transmitter and a receiver. The transmitter includes a transmitter transform A arranged to randomly distribute data to be transmitted in both time and frequency, and the transmitter is arranged to transmit a signal including the distributed data into a channel. The channel with interference is represented by $C^*$. The receiver is arranged to receive the signal, and the receiver includes a receiver transform $T^*$ arranged to perform a transform on the received signal so as to recover the data even in the presence of a strong ghost. The receiver transform is arranged so that the following equation is satisfied: $A \times C^* \times T^* = I$, and I is substantially the identity matrix.

In accordance with a further aspect of the present invention, a transmitter includes a transmitter transform which is arranged to randomly distribute data to be transmitted in both time and frequency. The transmitter is arranged to add a guard interval to the randomly distributed data. The guard interval is known, is non-empty, and is non-related to the randomly distributed data. The transmitter is arranged to transmit the randomly distributed data and guard interval.

BRIEF DESCRIPTION OF THE DRAWINGS

These and other features and advantages of the present invention will become more apparent from a detailed consideration of the invention when taken in conjunction with the drawings in which:

FIG. 1 shows an interference pattern which could result when two signals in the same frequency band are received by a receiver at substantially the same time;

FIG. 2 illustrates the response of an FIR filter which is commonly used as a time domain equalizer in a receiver in order to eliminate ghosts;

FIG. 3 illustrates a frequency domain equalizer which is used in a receiver in order to eliminate ghosts;

FIG. 4 illustrates an exemplary set of coefficients $b_i$ that are used by the frequency domain equalize of FIG. 3 in order to cancel ghosts;

FIG. 5 illustrates guard intervals which may be used between transmitted vectors in systems employing equalizers;

FIG. 6 illustrates an equalizer which includes a vector domain transform pair (i.e., a vector domain transform and an inverse vector domain transform) according to a preferred embodiment of the present invention;

FIG. 7 illustrates one portion of the vector domain transform pair of FIG. 6 in additional detail;

FIG. 8 illustrates a specific implementation of the portion of the vector domain transform pair illustrated in FIG. 7;

FIG. 9 illustrates the other portion of the vector domain transform pair of FIG. 6 in additional detail.

FIG. 10 illustrates an exemplary correlation result that may be obtained from the equalizer of FIG. 6;

FIG. 11 illustrates exemplary correlation results that may be obtained during a training session from the equalizer of FIG. 6; and, FIG. 12 is a diagrammatical overview of the present invention.

DETAILED DESCRIPTION

A vector domain equalizer 20 according to one embodiment of the present invention is shown in FIG. 6. The vector domain equalizer 20 relies on vectors to distribute the transmitted data in both time and frequency so that the vectors are essentially random in the time and frequency domains. Accordingly, in a heavily ghosted channel, all data can be recovered with small noise enhancement, and any enhanced noise that does exist is near white.

The vector domain equalizer 20 includes an inverse vector domain transform 22 and a vector domain transform 24 which are separated by a channel 26. Accordingly, the inverse vector domain transform 22 may be part of a transmitter, and the vector domain transform 24 may be part of a receiver. Alternatively, the vector domain transform 24 may be part of the transmitter and the inverse vector domain transform 22 may be part of the receiver, so that either portion of a transform pair may be in the transmitter as long as the receiver has the inverse of the portion that is in the transmitter. As a still further alternative, as in the case of the frequency domain equalizer 10 described above, both the inverse vector domain transform 22 and the vector domain transform 24 may be in the receiver. Indeed, one of the vector domain transform pair 22/24 is referred to as the vector domain transform and the other is referred to as the inverse vector domain transform only for convenience in order to merely denote the inverse relationship between the transform 22 and the transform 24.

The inverse vector domain transform 22 of FIG. 6 is shown in more detail in FIG. 7. A matrix multiplier 30 of the inverse vector domain transform 22 performs a matrix multiplication between an input data block 32 and a transform matrix 34. The input data block 32 may include any number of data elements arranged in a row. These data elements may be bits, symbols, or any other suitable data entities. The transform matrix 34 comprises a plurality of vectors arranged in columns, and each vector of the transform matrix 34 preferably has a length commensurate with the number of data elements of the input data block 32, although the size of the input data block 32 and the length of the vectors of the transform matrix 34 need not necessarily be commensurate. Also, the number of vectors of the transform matrix 34 should preferably (but not necessarily) be commensurate with the number of data elements in the input data block 32. For example, if there 256 data elements in the input data block 32, the transform matrix 34 should preferably have 256 vectors each having 256 elements. The output of the matrix multiplier 30 is an output data block 36 having a number of data elements commensurate with the number of data elements of the input data block 32. Thus, if there are 256 data elements in the input data block 32, the output data block has 256 data elements resulting from the matrix multiplication of the 256 element input data block 32 and the 256 element transform vectors of the transform matrix 34.

Because of the matrix multiplication performed by the matrix multiplier 30, each data element in the input data block 32 is distributed to each data element of the output data block 36. Accordingly, if one or more transmitted elements of the output data block 36 are lost in the channel or cannot be recovered in the receiver due to a ghost, the data elements of the input data block may be recovered in the receiver from the other (non-lost) transmitted elements of the received output data block 36. Thus, it should be noted that the vectors stored in the transform matrix 34 may be any vectors which, in combination with the matrix multiplier 30, distribute the data elements of the input data block 32 randomly throughout the vector domain occupied by the data elements of the output data block 36.

A specific example of the inverse vector domain transform 22 is shown in FIG. 8. As shown in FIG. 8, the operations of the matrix multiplier 30 and the transform matrix 34 are performed by (i) a dot product multiplier 42, which performs a dot product multiplication between the input data block 32 and a function $S_0$, and (ii) a Walsh transform 44, which performs a Walsh transform on the dot product results from the dot product multiplier 42 in order to produce the output data block 36. The function $S_0$ can be any distributing vector function which has good randomness properties. For example, the function $S_0$ may be a Bent function.

The vector domain transform 24 is shown in more detail in FIG. 9. The vector domain transform 24 includes a transform 50 which correlates the received signal with each of a plurality of receiver vectors $V_R$. That is, the transform 50 essentially performs a matrix multiplication between the received signal and the vectors $V_R$. This matrix multiplication assumes that the receiver employing the vector domain transform 24 is synchronized to the received signal. Any suitable synchronizer may be used to perform this synchronization.

The data transmitted through the channel 26 is received, for example, as a row vector. During matrix multiplication, the transform 50 multiplies each component of the received row vector by a corresponding component in a first column of the receiver vectors $V_R$, and sums the multiplication results to produce a first component $r_1$ of a vector $r_i$ at the output of the transform 50. The transform 50 next multiplies each component of the received row vector by a corresponding component in a second column of the receiver vectors $V_R$, and sums the multiplication results to produce a second component $r_2$ of the output vector $r_i$, and Before training, the vectors $V_R$ applied by the transform 50 are substantially identical to the vectors of the transform matrix 34. The vectors applied by the transform 50, however, may have a guard interval on each side of each vector to provide adequate separation between correlations. This guard interval should be known and should not be related to the transmitted data. For example, the guard intervals may contain components, such as bits, essentially all having substantially the same value, such as zero. Thus, in the present invention, no cyclic extensions of the receiver vectors $V_R$ applied by the transform 50 are required. After training, the receiver vectors $V_R$ applied by the transform 50 become the receiver vectors $V^*_R$ which are likely to be different from the vectors of the transform matrix 34.

Assuming no channel distortion such as may be caused by channel interference, and assuming that the transform 50 uses the same vectors as are stored in the transform matrix 34, the matrix multiplication performed by the transform 50 produces the input data block 32. An exemplary component j in the $i^{th}$ vector of the transform output r produced by the transform 50 under these conditions is shown in FIG. 10, where the output of the transform 50 may be designated $r_i$ as discussed above, and where the component j in the $i^{th}$ vector of the transform output r may be designated $r_{i_j}$.

However, if channel distortion exists, the actual component j in the $i^{th}$ vector of the transform output r may have the appearance of FIG. 11, depending upon the amount of channel distortion. Accordingly, this channel distortion may make the input data block 32 impossible to recover. In order to force the actual component j in the $i^{th}$ vector of the transform output r to have the appearance of FIG. 10 in the presence of channel distortion, a training session is invoked where the vectors of the transform 50 are adjusted according to channel distortion such that, in the presence of channel distortion, the data of the input data block 32 is recovered.

During training, a known data block is transformed by the matrix multiplier 30 and the transform matrix 34 in order to distribute the data in the known data block in both time and frequency. The transform of the known data block is transmitted through the channel and is matrix multiplied by the vectors $V_R$ in the transform 50 of the receiver. For example, the known data block may be transmitted periodically at known times, such as during the transmission of synchronization information.

A switch 54 is closed during training in order to pass the output data vector $r_{i_j}$ from the transform 50 to a comparator 56. The comparator 56 subtracts a reference vector $T_i$ from the output data vector $r_i$ produced by the transform 50 in order to produce an error vector $e_i$. The reference vector $T_i$ is the data which is produced by matrix multiplying the known data block by the vector matrix 34. Thus, the reference vector $T_i$ has as many components as there are data elements in the known data block. Accordingly, the comparator 56 subtracts the first component of the reference vector $T_i$ from the first data element in the output data vector $r_i$ from the transform 50 in order to produce a first error component $e_{i_1}$ in the error vector $e_i$, the comparator 56 subtracts the second component of the reference vector $T_i$ from the second data element in the output data vector $r_i$ from the transform 50 in order to produce a second error component $e_{i_2}$ in the error vector $e_i$, and so on. As a result, the error vector $e_i$ also has as many components as there are data elements in the known data block.

Thus, if the vectors applied by the transform 50 have already been fully adjusted to the point where the effects of channel distortion are effectively nullified, the error vector $e_i$ at the output of the comparator 56 is zero. However, if the vectors stored in the transform 50 are not fully adjusted so that the effects of channel distortion are not effectively nullified, the error vector $e_i$ at the output of the comparator 56 is not zero. For example, the error component j of the error vector $e_i$ may be the difference between component j of the reference vector $T_i$ as shown in FIG. 10 and the output $r_{i_j}$ from the transform 50 for data element j as shown in FIG. 11.

Gain (k) is applied by an amplifier 58 to the error vector $e_i$ from the comparator 56 in order to produce a gain adjusted error vector $ke_i$. This gain is preferably less than one so that the vectors applied by the transform 50 are not corrected in one operation, which could otherwise lead to instability. The vectors applied by the transform 50 may be replicated in a memory 60. A multiplier 62 multiplies the gain adjusted error vector $ke_i$ from the gain block 58 and the vectors stored in the memory 60, and a summer 64 adds the multiplication results back to those vectors and stores the adjusted vectors back in the memory 60. Specifically, the multiplier 62 multiplies the first component of the gain adjusted error vector $ke_i$ from the gain block 58 and the first column of the vectors stored in the memory 60, and the summer 64 adds this multiplication result back to that first column and stores that adjusted first column in the memory 60. Next, the multiplier 62 multiplies the second component of the gain adjusted error vector $ke_i$ from the gain block 58 and the second column of the vectors stored in the memory 60, and the summer 64 adds this multiplication result back to that second column and stores that adjusted second column in the memory 60. This operation is repeated for each of the columns stored in the memory 60. When all columns stored in the memory 60 have been so adjusted, the vectors stored in the memory 60 are loaded into the transform 50 for application to subsequent received vectors.

Because of the gain imposed by the amplifier 58 on the error from the comparator 56, several training data blocks must be transmitted in order for the vectors applied by the transform 50 to properly recover the input data at the output of the transform 50. Each training data block should preferably be different. Once the vectors applied by the transform 50 reach the fully adjusted state where the error from the comparator 56 is zero, these vectors have been influenced by channel effects such that, when they are used by the vector domain equalizer 20, ghosts are substantially eliminated from a received signal.

In summary, the present invention operates in accordance with the following description. As shown in FIG. 12, data-in to be transmitted are processed in blocks by a first transform A (i.e., the inverse vector domain transform 22) of a transform pair A/T to produce processed data d1. (Each data block data-in may contain, for example, 256 symbols.) The processed data d1 have the property that the original data elements in data-in are distributed evenly and randomly by the first transform A into the processed data d1. (This distribution is predefined by the first transform A and is known.) The processed data d1 are then transmitted through the channel C and arrive at the receiver as received data d2. The received data d2 are processed by a second transform T (i.e., the vector domain transform 24) of the transform pair A/T to produce output data-out. The second transform T is the inverse of the first transform A under ideal channel conditions where d1=d2 and C is equal to the identity matrix I. Accordingly, A×C×T=I, where × denotes matrix multiplication. After the received data d2 is processed by the second transform T, the original information data-in are restored so that data-in=data-out. When there is interference in the channel C such that the channel becomes C*, A×C*×T≠I and, therefore, data-out≠data-in. However, after a minimizing process such as the training protocol described above, the second transform T becomes T* so that A×C*×T*=I and, therefore, data-out=data-in. Thus, all information in data-in is recovered. It should be noted that, as the second transform T is modified into T*, some noise enhancement results. However, in this case, the enhanced noise is near white when viewed at data-out because of the even/random distribution/redistribution of data.

Certain modifications of the present invention have been discussed above. Other modifications will occur to those practicing in the art of the present invention. For example, a particular transform pair is illustrated in FIGS. 5–8. However, it should be understood that any other transform pair may be used in connection with the present invention as long as the data to be transmitted are distributed substantially uniformly in both time and frequency.

Moreover, because the present invention operates most satisfactorily in the presence of ghosts and other linear distortions, the term ghost as used herein in connection with the present invention includes ghosts and/or other linear distortions.

Furthermore, as described above, the transform 50 is modified through training so that, in the presence of channel interference and changing channel interference, the data recovered by the transform 50 is the same as the input data 32. However, the transform 50 may be modified by processes other than training.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A receiver, wherein the receiver receives a signal containing data distributed in both time and frequency, the receiver comprising:
   a vector transform arranged to perform a transform on the received signal using a plurality of transmitter dependent transform vectors; and,
   a vector adjuster responsive to the transform of the received signal in order to adjust the transform vectors to recover the data even in the presence of a strong ghost.

2. The receiver of claim 1 wherein the vector adjuster comprises a comparator arranged to compare the transform to a reference.

3. The receiver of claim 2 wherein the reference is a known block of data stored in the receiver.

4. The receiver of claim 3 wherein the reference is stored in a transmitter and is used to form a training signal that is used by the vector adjuster to adjust the transform vectors.

5. The receiver of claim 2 wherein the vector adjuster comprises a vector modifier arranged to modify the transform vectors in response to the comparator so that the transform vectors are modified to compensate for channel interference.

6. The receiver of claim 2 wherein the comparator produces comparison results, and wherein the vector adjuster comprises a gain block arranged to impose a fractional gain on the comparison results.

7. The receiver of claim 6 wherein the vector adjuster comprises a vector modifier arranged to modify the transform vectors in response to the comparison results so that the transform vectors are modified to compensate for channel interference.

8. The receiver of claim 6 wherein the vector adjuster comprises a multiplier arranged to multiply an output of the gain block and the transform vectors.

9. The receiver of claim 8 wherein the multiplier produces multiplication results, and wherein the vector adjuster comprises a summer arranged to sum the multiplication results and the transform vectors in order to adjust the transform vectors.

10. The receiver of claim 1 further comprising a switch arranged to interconnect the vector transform and the vector adjuster during vector adjustment.

11. The receiver of claim 1 wherein the vector transform performs a matrix multiplication of the received signal and the transform vectors.

12. The receiver of claim 1 wherein the vector adjuster is arranged to adjust the transform vectors in accordance with channel interference.

13. A receiver, wherein the receiver receives a signal from a channel, wherein the channel is designated as C when the channel has interference, wherein the signal contains data, wherein the data has been processed by a transmitter transform A so that the data is distributed in both time and frequency, wherein the receiver includes a receiver transform arranged to perform a transform on the received signal using a plurality of receiver transform vectors so as to recover the data even in the presence of a strong ghost, wherein the receiver transform is designated as T*, wherein the receiver transform vectors are arranged so that the following equation is satisfied:

$$A \times C^* \times T^* = I$$

wherein × denotes matrix multiplication, and wherein I is substantially the identity matrix.

14. The receiver of claim 13 wherein the channel is designated as C when the channel has no interference, wherein the receiver transform if channel interference is not present in the channel is designated as T, wherein the receiver transform if channel interference is present in the channel is designated as T*, and wherein the receiver transform satisfies the following equation with no channel interference:

$$A \times C \times T = I.$$

15. The receiver of claim 14 wherein C=I.

16. The receiver of claim 14 wherein the receiver comprises an adjuster, and wherein the adjuster is arranged to adjust the receiver transform vectors in response to the channel interference in order to produce the receiver transform T*.

17. The receiver of claim 16 wherein the adjuster comprises a comparator arranged to compare the transform to a reference.

18. The receiver of claim 17 wherein the reference is a known block of data stored in the receiver.

19. The receiver of claim 18 wherein the reference is stored in a transmitter and is used to form a training signal that is used by the vector adjuster to adjust the transform vectors.

20. The receiver of claim 17 wherein the comparator produces comparison results, and wherein the adjuster further comprises a gain block arranged to impose a fractional gain on the comparison results.

21. The receiver of claim 20 wherein the adjuster further comprises a multiplier arranged to multiply an output of the gain block and the receiver transform vectors.

22. The receiver of claim 21 wherein the multiplier produces multiplication results, and wherein the adjuster further comprises a summer arranged to sum the multiplication results and the receiver transform vectors in order to produce the receiver transform T*.

23. The receiver of claim 22 further comprising a switch arranged to interconnect the receiver transform and the adjuster during vector adjustment.

24. The receiver of claim 13 wherein the receiver transform performs a matrix multiplication of the received signal and the receiver transform vectors.

25. The receiver of claim 13 wherein C designates the channel when the channel has no interference, wherein T designates the receiver transform without channel interference, and wherein $T = A^1$ when there is substantially no channel interference.

26. A communication system including a transmitter and a receiver, wherein the transmitter includes a transmitter transform arranged to randomly distribute data to be transmitted in both time and frequency, wherein the transmitter transform is designated as A, wherein the transmitter is arranged to transmit a signal including the distributed data into a channel, wherein the channel is designated as C* when the channel has interference, wherein the receiver is arranged to receive the signal, wherein the receiver includes a receiver transform arranged to perform a transform on the received signal so as to recover the data even in the presence of a strong ghost, wherein the receiver transform is designated as T*, wherein the receiver transform is arranged so that the following equation is satisfied:

$$A \times C^* \times T^* = I$$

wherein × denotes matrix multiplication, and wherein I is substantially the identity matrix.

27. The communication system of claim 26 wherein the channel is designated as C when the channel has no interference, wherein the receiver transform without channel interference is designated as T, wherein the receiver transform with channel interference is designated as T*, and wherein the receiver satisfies the following equation with no channel interference:

$$A \times C \times T = I.$$

28. The communication system of claim 27 wherein C=I.

29. The communication system of claim 26 wherein the receiver transform performs a matrix multiplication of the received signal and the receiver transform vectors.

30. A method comprising:
   receiving a signal containing data distributed in both time and frequency; and,
   performing a vector transform on the received signal using a plurality of receiver transform vectors, the receiver transform vectors being based upon a corresponding plurality of transmitter vectors and channel effects so that the vector transform recovers the data even in the presence of a strong ghost, wherein the vector transform is a matrix multiplication of the received signal and the receiver transform vectors.

31. The method of claim 30 wherein the receiver transform vectors are the transmitter vectors modified according to the channel effects.

32. The method of claim 30 further comprising receiving a training signal, performing a vector transform on the training signal using the plurality of receiver transform vectors to produce transform results, comparing the transform results to a reference to produce comparison results, and adjusting the receiver transform vectors based upon the comparison results, wherein training signal is related to the reference.

33. The method of claim 30 further comprising comparing an output of the vector transform to a reference so as to produce comparison results.

34. The method of claim 33 wherein the reference is a known block of data stored in a receiver.

35. The method of claim 33 further comprising adjusting the transform vectors in response to the comparison results so that the receiver transform vectors are adjusted to compensate for channel interference.

36. The method of claim 33 further comprising imposing a fractional gain on the comparison results so as to produce gain results.

37. The method of claim 36 further comprising adjusting the transform vectors in response to the gain results so that the receiver transform vectors are adjusted to compensate for channel interference.

38. The method of claim 36 further comprising multiplying the gain results and the receiver transform vectors to produce multiplication results.

39. The method of claim 38 further comprising summing the multiplication results and the receiver transform vectors in order to adjust the receiver transform vectors.

* * * * *